(No Model.) 2 Sheets—Sheet 1.

W. R. BULLIS.
GASOLENE ENGINE.

No. 597,389. Patented Jan. 18, 1898.

WITNESSES
A. B. Driggs
H. G. Homer

INVENTOR
William R. Bullis
By M. D. Peck
His Attorney (No Model.) 2 Sheets—Sheet 2.
W. R. BULLIS.
GASOLENE ENGINE.
No. 597,389. Patented Jan. 18, 1898.
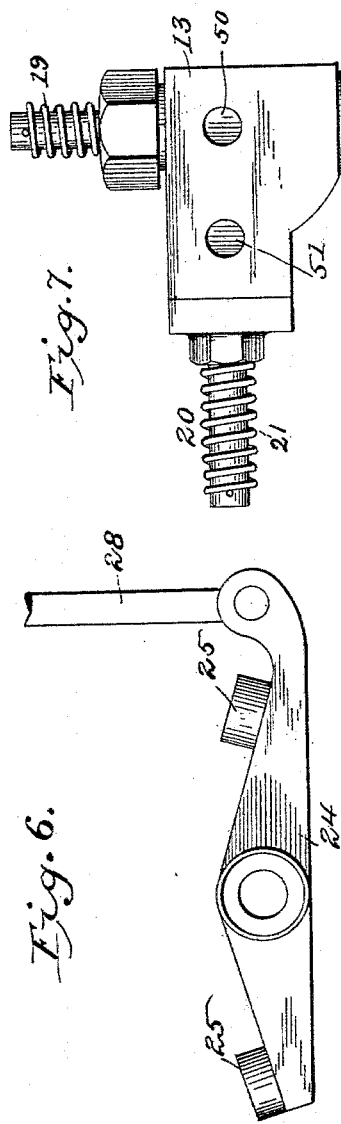
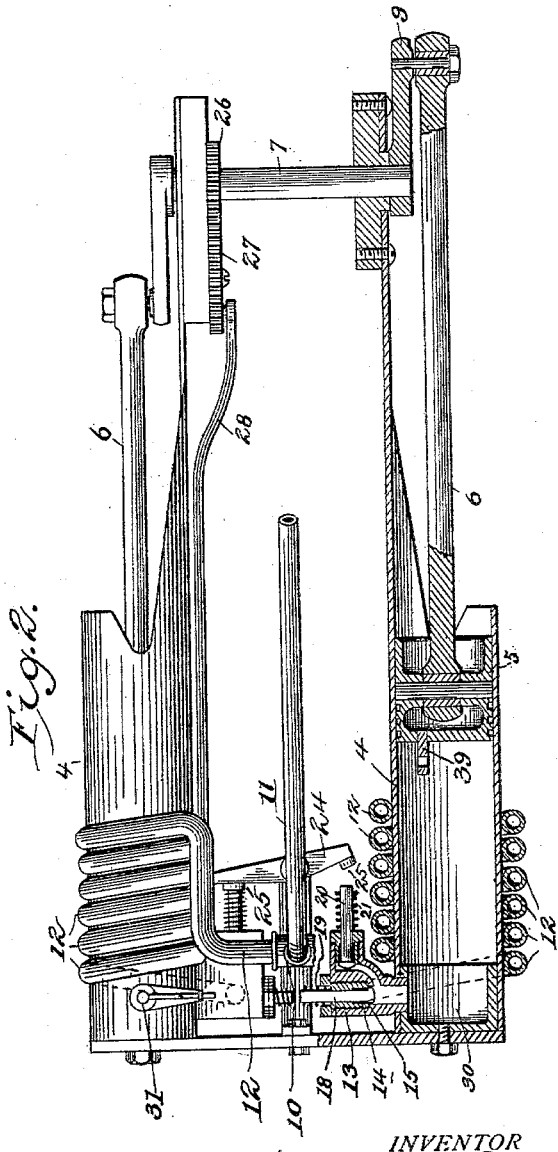
WITNESSES
A.B.Driggs
H. G. Homer
INVENTOR
William R. Bullis
By M.D. Peck
His Attorney
THE NORRIS PETERS CO., PHOTO-LITHO., WASHINGTON, D. C.

UNITED STATES PATENT OFFICE.

WILLIAM R. BULLIS, OF CHATHAM, NEW YORK.

GASOLENE-ENGINE.

SPECIFICATION forming part of Letters Patent No. 597,389, dated January 18, 1898.

Application filed June 16, 1897. Serial No. 641,029. (No model.)

*To all whom it may concern:*

Be it known that I, WILLIAM R. BULLIS, a citizen of the United States, residing at Chatham, in the county of Columbia and State of New York, have invented certain new and useful Improvements in Gasolene-Engines; and I do hereby declare the following to be a full, clear, and exact description of the invention, such as will enable others skilled in the art to which it appertains to make and use the same, reference being had to the accompanying drawings, which form part of this specification.

My invention relates to that class of vapor-engines designed for use in driving bicycles or other wheeled vehicles, and has for its object to provide a simple, inexpensive, durable, and easily-controlled vapor-engine in which the liability of the cylinder becoming heated to too high a degree is materially reduced, and also has for its further object to improve the construction of the igniting means and other details of the device; and it consists in the construction hereinafter described, and more particularly pointed out in the claims.

Figure 1:
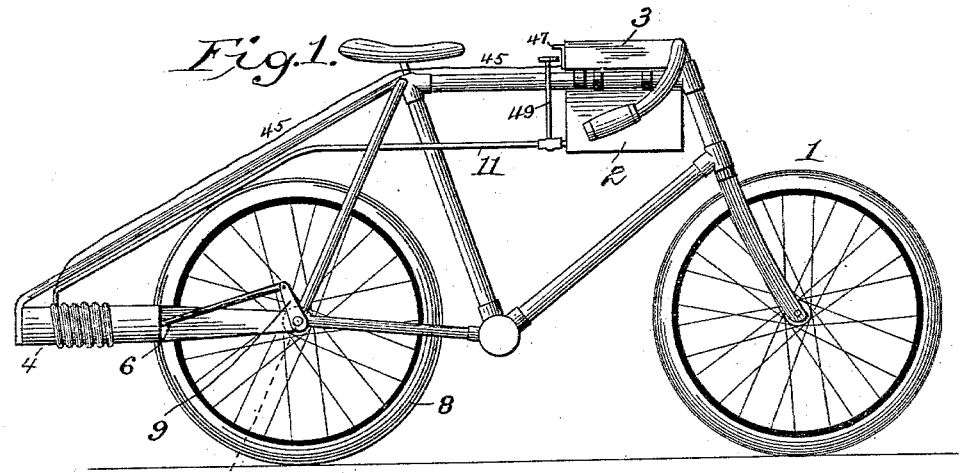
Figure 3:
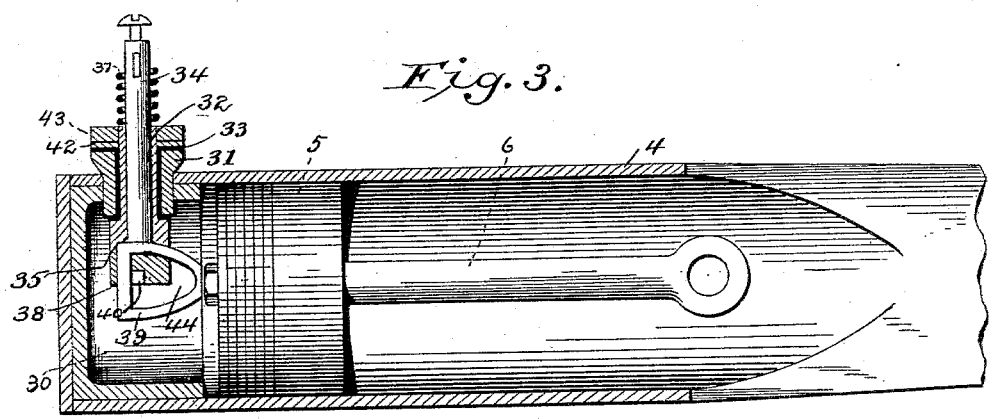
Figure 4:
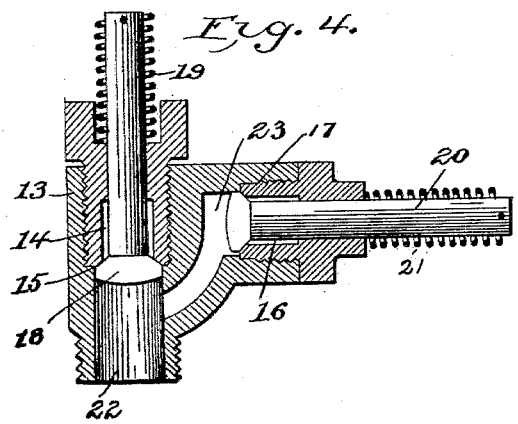
Figure 5:
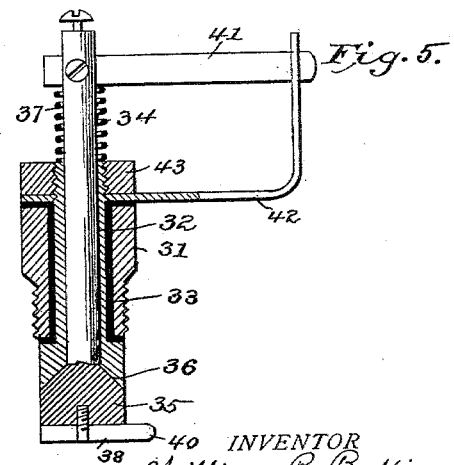

Referring to the drawings, Figure 1 is a side elevation of a bicycle provided with my improved vapor-engine. Fig. 2 is a view of the engine, partly in plan and partly in horizontal sections. Fig. 3 is a vertical longitudinal section through one cylinder. Fig. 4 is a detail sectional view showing the inlet and exhaust valves and the plug containing the same. Fig. 5 is a sectional view of the igniter. Fig. 6 is a detail view of the rocker-arm and end of the valve-rod attached thereto; and Fig. 7 is a plan view of the valve-casing, looking at the under side thereof.

1 designates a bicycle, which is of the usual construction, and 2 represents the oil-reservoir, provided with means for the admission of air thereto, whereby it also forms a carbureter, and 3 an electric battery.

The cylinders 4 of the motor are supported adjacent to the driving-wheel 8 of the bicycle and are connected with the bicycle-frame by any suitable arrangement of bracing-rods.

5 designates the pistons, and 6 the piston-rods pivoted thereto. On the ends of the axle 7 of the rear wheel 8 are secured cranks 9, with which the outer ends of the pitmen or piston-rods 6 are pivotally connected.

Arranged between the engine-cylinders 4 is a T-coupling 10, in one branch of which extends a pipe 11, leading thereto from the reservoir 2, and into the other branches of which extend, respectively, the ends of the two pipes 12, which latter pipes are coiled around the outside of the cylinders 4, as plainly shown in the drawings.

The firing-chamber 30 of each cylinder is provided with a valved casing 13, which is formed to provide an inlet-passage 14, having a port 50 and a valve-seat 15, and an exhaust-passage 16, having a port 51 and a valve-seat 17. Said inlet-passage is closed by a valve 18, having a spring 19 for holding it to its seat. In the exhaust-passage is a valve 20, held to its seat by a spring 21, which encircles the stem of said valve. These two passages are located at right angles with each other, and the one for the inlet of air and oil opens directly into a passage 22, which has communication with the exhaust-passage 16 by means of the passage-way 23.

The pipes 12 each communicates at one end with the oil-supply pipe 11 and opens at its other end in the respective ports 50 in the inlet-passages 14, whereby the oil will be caused to circulate throughout a lengthened and circuitous course around the outside of the cylinders in pipes that are subject to the cooling action of the atmosphere, and the vapor formed in said pipes by the heat radiated from the cylinders will be conducted thereby to said cylinders.

24 designates a rocking arm having projections 25 thereon to engage the stems of the exhaust-valve 20 and force the same one at a time away from their respective seats when the arm is rocked, thereby opening the exhaust-passage to permit the exploded charge to flow from the engine-cylinder after the charge has performed its work and give room for a new charge. In order that the exhaust-passages shall be opened at proper times, the rear axle 7 of the bicycle is provided with a pinion 26, which intermeshes with the gear-wheel 27, and pivoted to the face of said gear-wheel at one side of the center thereof is one end of a connecting-rod 28, the other end of which rod is pivotally attached to one end of the rocker-arm 24.

Entering the firing-chamber 30 of the respective engine-cylinders is a plug 31, through which extends a sleeve 32, which is insulated, as shown at 33, and through said sleeve extends a rod 34, having a head 35 at its outer end. The outer end of the sleeve 32 has a beveled seat 36 for the head 35, and the other end of rod 34 is provided with a coiled spring 37, which holds the head in its seat. The head 35 is provided with a contact-piece 38, which is electrically connected with a battery 3 and projects at one end at 40 beyond said head and into the path of a contact-piece 39, carried by the piston. When said contact-pieces are engaged with each other, an electric spark is produced which fires the charge in the firing-chamber. The contacts 38 and 39 have a rubbing contact one on the other to keep them bright and insure proper action. The contact 38 is held in position by a flat spring 41, having one end secured to said rod 34 and the other end engaged with a rigid bent arm 42, projecting from the plug 31 and clamp in position by the nut 43. The contact-piece 39 consists of a plate formed with an open center 44. The electric battery is connected with the igniter by the wire 45, and a switch 47 is interposed in the circuit and located adjacent to the handle-bars for controlling the circuit to the igniter.

From the foregoing description the operation of my invention will be readily understood to be as follows: The gasolene is conveyed from the reservoir to the T-coupling 10 through the coils 12, in which it is vaporized by the heat radiated from the engine-cylinder. The mixed air and combustible vapor flows from the coils 12 into the passages 14. The suction created by each outward stroke of the piston 5, as shown in Fig. 2, operates to draw the valve 18 inward away from its seat, thereby permitting the combustible vapor to flow into the firing-chamber 30, within which it is compressed by the inward stroke of the piston 5. The inward stroke of the piston brings the contact-piece 39 into engagement with the projection 40, and its further movement causes the contact-piece 38 to be pushed aside against the action of spring 41 to permit the ends of the contact-piece 39 to pass by, after which the contact-piece is immediately returned to its former position, but with its projection 40 within the open center of said contact-piece 39. During this time an electric spark is produced, which fires the compressed charge within the fire-chamber 30, and the expansion of the gases thus obtained acts on the piston to force it outward. At proper times in the stroke of the piston 5 the arm 24 is rocked and caused to engage the stem 20 of the exhaust-valve and push the latter away from its seat, so as to free the engine-cylinder from the expended charge, after which the exhaust-valve immediately returns to its seat by the spring 21, when the arm 24 is rocked in the other direction. It will of course be understood that when the piston 5 in one cylinder is moving outward the piston in the other cylinder is moving inward, thereby communicating a continuous motion to the axle 7. The supply of gasolene or other combustible fluid is controlled by the operator by means of a suitable valve, as indicated at 49.

It will be observed that the coils of the respective pipes 12 are placed at a slight distance from each other to allow of a circulation of air between them, whereby they are kept comparatively cool, and it will also be observed that the use of the separated coils, located entirely outside the engine-cylinders and almost entirely surrounded by air, will retard the heating of the cylinder to too high a degree, if it does not altogether prevent such heating.

Having thus fully described my invention, what I claim as new, and desire to secure by Letters Patent, is—

1. In a vapor-engine, the combination with the oil-reservoir, the engine-cylinder, and the oil-supply pipe leading from said reservoir, of a pipe communicating at one end with said supply-pipe and at its other end with said cylinder, said pipe being coiled around said cylinder and entirely outside the same, so as to be partially surrounded by atmospheric air, whereby the oil is quickly converted into vapor and excessive heating is prevented, and means for controlling the supply of vapor from said coils to the engine-cylinder, as and for the purpose set forth.

2. In a vapor-engine the combination with a pair of cylinders, the pistons, the reservoir and T-coupling between the cylinders, of a pipe extending from the reservoir to one branch of said coupling, the pipes extending from the other branches of said coupling to the reservoir and coiled entirely outside of and around the cylinders, and the valves for controlling the admission of vapor to the cylinders from the coils, as and for the purpose set forth.

3. In a vapor-engine, the combination with a pair of cylinders and the pistons therein, of the plugs each screwed at one end into the firing-chamber of a cylinder and extending outward beyond said cylinder, the outer end of each plug being formed with a supply and exhaust passage extending substantially at right angles with each other and the inner end of each plug being formed to provide a chamber opening at one end into the cylinder and at the other end into both of said passages, spring-pressed valves seated in said supply-passages and moved from their seats by the suction created by the outward stroke of the piston, spring-pressed valves seated in said exhaust-passages and having stems projecting outward beyond the plugs, and means engaging said stems for forcing the same away from their seats, as and for the purpose set forth.

4. A vapor-engine, having a pair of cylinders with pistons therein, a plug screwed at one end into the firing-chamber of each cylinder and extending outward beyond the same, the outer end of each plug being formed with a supply and exhaust passage extending at right angles with each other and the inner end of the plugs being formed to provide a chamber opening at one end into the cylinder and at its other end into both of said passages, spring-pressed valves seated in said supply-passages and moved from their seats by the suction created by the outward stroke of the pistons, spring-pressed valves seated in said exhaust-passages and having stems projecting outward beyond said plugs, a rocker-arm pivoted between the plugs and having its ends alternately to engage the stems of the exhaust-valve to force said valves from their seats, means for operating said rocker-arm, a T-coupling between the plugs, an oil-reservoir, a pipe extending from the reservoir to one branch of the coupling, and pipes extending from the other branches of the coupling to the supply-passages in the plugs and coiled around the cylinders and igniters, as and for the purpose set forth.

5. In a vapor-engine, the combination with the cylinder, a piston and a contact-piece carried by the piston, of a plug screwed in said cylinder, a sleeve extending through the plug and insulated therefrom, the inner end of said sleeve being formed for a seat, a rod extending loosely through the sleeve and having at its inner end a head seated on the inner end of the sleeve, a spring encircling said rod for holding the head to its seat, a bent rigid arm extending from said plug, a flat spring extending from one end of said rod and engaging the arm, and a contact-piece projecting from said head into the path of the first-mentioned contact-piece, as and for the purpose set forth.

6. In a vapor-engine, the combination with the cylinder, a piston and a rigid contact-piece carried by said piston and having an open center, of a plug attached to said cylinder, a sleeve extending through the plug and formed to provide a seat at its inner end, a rod extending loosely through the sleeve and having its inner end engaging said seat, a contact projecting from the inner end of the rod, a spring encircling said rod by holding its inner end to its seat, and a flat spring engaged with said rod at one end and with a stationary abutment at its other end, as and for the purpose set forth.

7. The combination of a pair of engine-cylinders, a plug attached to each of said cylinders, a spring-pressed exhaust-valve in each plug, the pistons and the vehicle-axle with which the pistons are connected, a pinion on said axle, a gear meshed with said pinion, a rocker-arm pivoted between said plugs and having its ends arranged to engage said valve-stems directly, and force the valves one at a time from their seats, and a valve-rod having one end pivoted to one end of said rock-shaft and its other end pivoted to said gear, as and for the purpose set forth.

8. The combination with a vehicle-axle, pistons connected therewith, a pair of engine-cylinders, a T-coupling between said cylinders, a plug for each cylinder, having supply and exhaust passages, a supply and exhaust valve in each of the plugs, a rocker-arm pivoted between said plugs and arranged to engage the stems of the exhaust-valves directly, connections between the rocker-arm and the axle, a reservoir, a liquid-supply pipe extending from the reservoir to one member of the T-coupling, vapor-supply pipes extending from the other branches of said coupling, to the supply-passages in the respective plugs and coiled around said cylinders and an igniter, as and for the purpose set forth.

In testimony whereof I affix my signature in presence of two witnesses.

WILLIAM R. BULLIS.

Witnesses:
C. E. BARRETT,
GEORGE C. LEIGH.